United States Patent [19]

Buck et al.

[11] Patent Number: 4,686,830
[45] Date of Patent: Aug. 18, 1987

[54] SYSTEM FOR CONTROL OF THE SUPERCHARGING OF AN INTERNAL COMBUSTION ENGINE

[75] Inventors: Rainer Buck, Tamm; Wolf Wessel, Oberriexingen; Gerhard Stumpp, Stuttgart, all of Fed. Rep. of Germany

[73] Assignee: Robert Bosch GmbH, Stuttgart, Fed. Rep. of Germany

[21] Appl. No.: 781,758

[22] Filed: Sep. 30, 1985

[30] Foreign Application Priority Data

Oct. 18, 1984 [DE] Fed. Rep. of Germany ....... 3438175

[51] Int. Cl.$^4$ ............................................. F02D 23/00
[52] U.S. Cl. ........................................ 60/603; 60/602
[58] Field of Search ................ 60/600, 601, 602, 603, 60/611; 123/564

[56] References Cited

U.S. PATENT DOCUMENTS 4,392,352 7/1983 Stumpp et al. ..................... 60/602

FOREIGN PATENT DOCUMENTS 136541 4/1985 European Pat. Off. ............. 60/602

Primary Examiner—Stephen F. Husar

Attorney, Agent, or Firm—Frishauf, Holtz, Goodman & Woodward

[57] ABSTRACT

An automatic control for an adjustable turbosupercharger in the air supply of an internal combustion engine adds a static anticipatory control signal and a dynamic anticipatory control signal to the error signal that is provided to an actuating mechanism for the control of the supercharger. The error signal is obtained by comparing actual charging pressure with a reference charging pressure for one portion of the control displacement and in the other portion of the control displacement the error signal is obtained by comparing actual air quantity supplied to an engine cylinder with a reference air quantity. This results from a limiting device interposed in the charging pressure control loop. The static anticipatory control depends on engine speed and engine load and is supplied with additive corrections for engine temperature and for battery voltage. A limit value dependent upon engine speed is introduced through a minimum circuit to put a lower limit on the sum of error signal and static anticipatory control and the resulting signal is then added to a dynamic anticipatory control and derived from rate of control displacement. The control signal is also interrupted during the engine start period.

15 Claims, 7 Drawing Figures 016,686,830

SYSTEM FOR CONTROL OF THE SUPERCHARGING OF AN INTERNAL COMBUSTION ENGINE

This invention concerns the control of the air charging pressure of an internal combustion engine equipped with an adjustable exhaust gas driven turbosupercharger with transducers for providing signals corresponding to the air supply of the engine, either in terms of the air pressure of the air quantity charged into the cylinder and having an air input control loop for affecting the adjustment position of the exhaust driven supercharger in response to air input conditions.

It is known to modify or adjust the charging pressure of an internal combustion engine by means of an adjustable exhaust gas driven turbosupercharger. In the known arrangement an output control of the supercharger is affected, for example by a charge pressure control loop that processes, as the actual pressure value, the value of the output signal of a charge pressure sensor. It is likewise possible to modify the setting of the supercharger by means of an air quantity control loop, in which case the output signal of an air quantity measurer is supplied as the actual value signal for comparison with a reference value signal.

The provision of a reference value, in both cases, is carried out in a manner dependent upon the load of the engine, its speed of rotation, and the like.

It has now been found that the control of the charging air pressure of an engine, for example, by means of a charging pressure control loop, operates too slowly under certain operating conditions of the engine and at times also reacts falsely and, on the whole, in a manner too vulnerable to error.

SUMMARY OF THE INVENTION

It is an object of the present invention to provide a more reliable system for controlling and regulating the supercharged air supply to an internal combustion engine which will operate with sufficient speed under all conditions.

Briefly, the positioning of the adjustment of the turbosupercharger is additionally affected by anticipatory control component values. Anticipatory control is sometimes referred to as pilot control.

The system of the invention has the advantage that with it a quick and error-free control of charging pressure, insensitive to disturbances or instabilities, becomes possible. By limiting output signals of the control system it is possible with particular advantage to reduce still further the sensitivity of the system as a whole to errors and sources of malfunction.

BRIEF DESCRIPTION OF THE DRAWINGS

Further details of the invention are described further below by way of illustrative example with reference to the annexed drawings, in which.

DESCRIPTION OF THE ILLUSTRATED EMBODIMENTS

As already mentioned, the invention concerns a system for control of the charging pressure of an internal combustion engine. The use of the system of the invention is not limited to a particular type of internal combustion engine, but is quite generally applicable, for example for diesel engines, gasoline engines, etc. The invention is likewise not limited to a particular circuitry of construction, but can be constituted not only in analog circuit technology, but also in digital form, thus for example with the use of a correspondingly programmed digital computer.

Figure 1:
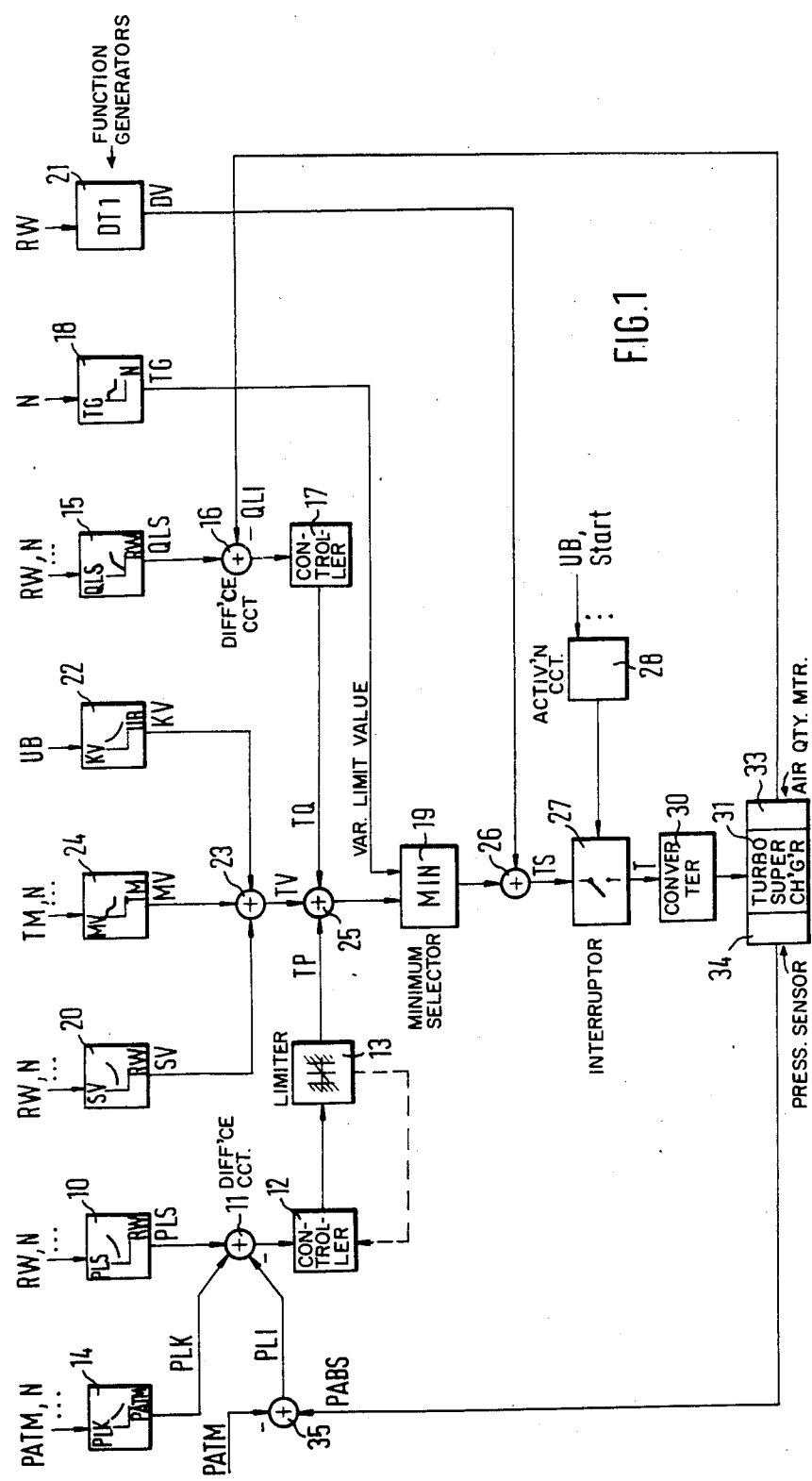
FIG. 1 is a block circuit diagram of a system according to the invention for controlling a turbosupercharger with an anticipatory component of control.

FIG. 1 shows a block circuit diagram of the system for controlling operation of a turbosupercharger with anticipatory control in accordance with the invention. In this figure an output signal representing the desired relative charge pressure PLS is produced by a reference charge pressure characteristic 10 in a manner dependent upon the control displacement RW and the engine speed N. The desired relative charge pressure PLS is correlated with a signal derived from the actual relative charge pressure PLI by means of a difference circuit 11, the signal PLI being applied negatively and the signal PLS being applied positively to a summing circuit for this purpose. The resulting signal at the output of the difference circuit 11 is supplied to a controller 12. This controller 12 can, for example, be a controller with proportional-integral behavior. Altitude correction 14 is also provided which produces an output signal PLK in a manner dependent upon atmospheric pressure PATM and, if desired, also in a manner dependent upon speed N, this output signal PATM likewise being supplied to the difference circuit 11 and thereby making a contribution to the input of the controller 12.

A limiter circuit 13 is provided in cascade at the output of the controller 12 by means of which the output signal of the controller 12 is limited to particular predeterminable characteristic values. The output signal of the limiting circuit 13 is a control signal designated TP in the charge pressure control loop. An air quantity characteristic field 15 is supplied with a signal relative to the control displacement RW and another related to the engine speed N, and forms therefrom an output signal representing the desired sucked-up air quantity QLS.

The control displacement RW can be regarded as a signal related to engine load. In an engine using fuel injection it is the positioning of a member of the fuel injection pump that determines the amount of fuel injected per stroke, thus it may be the length of the stroke or the setting of a member that determines the length of stroke. In older type gasoline engines it might correspond to the setting of the throttle valve, or the displacement of the accelerator pedal with reference to some fixed position thereof.

By means of another difference circuit 16, the desired air quantity QLS is correlated with the actually sucked-up air quantity QLI, providing an output signal of the difference circuit 16 that is supplied to the controller 17. This controller 17 can likewise be a controller with proportional-integral behavior. The output signal of the controller 17 represents a control signal TQ in the air quantity control operation.

A static anticipatory control 20 is supplied with the signal RW referring to the control displacement and with the signal N regarding engine speed. In a manner dependent thereon, the static anticipatory control 20 forms the output signal SV that is connected to the summing circuit 23.

A correction signal source 22 produces an output signal KV that depends upon the battery voltage UB of the engine, this being likewise supplied to the summing circuit 23. Finally an engine temperature anticipation signal 24 is provided that forms an output signal MV that is dependent upon motor temperature TM and likewise also on the engine speed N, this likewise being provided to the summing circuit 23. The summing circuit 23 combines the signals SV, KV and MV into an output signal, the control signal for anticipation that is designated TV. A further summing circuit 25 supplied with the control signals TP, TQ and TV and combines these into an output signal that is supplied to a minimum selector, which selects for its output the lower of its input signals.

The minimum selector 19 is also supplied with a limit value TG that is formed from a limiting unit 18 in a manner dependent upon the engine speed N. The limit value circuit 18 together with the minimum selector 19 fulfill the function of maximum value limiting of the values of the output signal of the summing circuit 25 with respect to the predeterminable values of the limit unit 18.

The signal relating to the control displacement RW is also connected to a dynamic anticipatory control unit 21. The latter produces, as a function of RW, an output signal designated DV that is supplied to still another summing circuit 26. The latter then produces, from DV and from the output signal of the minimum selector 19, a summation signal designated TS which is connected to an interruptor 27. The interrupted 27 is controlled either into its open condition or its closed condition by an activation circuit 28 which produces the opening and closing in a manner dependent on the battery voltage UB, a signal which indicates the operating condition of starting of the engine, or both. If the interruptor 27 is closed, for example, this has the consequence that the output signal TS of the summing circuit 26 is supplied directly to a converter 30, the activating signal to the converter 30 being designated T.

The converter 30 can for example be an electropneumatic converter that receives electrical signals at its input which it converts into a corresponding vacuum. A change of the electrical signal at the input of the converter 30 then causes a change of the vacuum mentioned.

An exhaust gas turbosupercharger 31 is connected adjacent to the converter 30 and its mechanism can for example be changed in geometrical configuration in response to the variable vacuum received from the converter 30, in such a way that a change of the input vacuum produces a change of the charging pressure of the enginge. It is thus possible in an overall manner, by means of the converter 30 and the turbosupercharger 31, to affect the charge pressure of the engine in a manner dependent upon the signal T.

Finally, there is shown in FIG. 1 an air quantity meter designated 33 and also a charge pressure sensor designated 34. The output of the air quantity meter 33 is the actually sucked-in air quantity QLI which, as already mentioned, is supplied to the difference producing circuit 16. The output signal of the charge pressure sensor 34, on the other hand, is a signal referring to the absolute charge pressure PABS, that is correlated with a signal representing the atmospheric pressure PATM to produce the already mentioned actual relative charge pressure PLI. The correlation is carried out by a difference-forming circuit 35. The signal PLI just mentioned is then connected to the difference-forming circuit 11.

The charge pressure control loop which consists principally of the reference charge pressure field 10, the difference circuit 11 and the controller 12, is already in itself known. It has the function of controlling the actual relative charge pressure PLI to the value of the desired relative charge pressure PLS. The limiting unit 13 that follows in cascade after the controller 12 assures that the controller 12 has only a limited possibility of attack in the described control loop. Because of the limiting unit 13 an erroneous value of the actual relative charge pressure PLI can produce an erroneous activation of the converter 30 and thereby of the supercharger 31 only up to a certain degree. It is particularly advantageous then to hold the controller 12, therefore at least to fix the output signal of the controller 12 at a particular limit value, during the period of time in which the output signal of the controller 12 is limited by the limit unit 13 to a particular predetermined value. Thus a so-called clamping, for example of the integral component of the controller 12, takes place. This is illustrated in FIG. 1 by the broken line arrow connection from the limit unit 13 to the controller 12. Of course it is also possible in a particular case when there is the need for a limiter to limit that component entirely.

The air quantity control loop that consists principally of the air quantity reference characteristic field 15, the difference circuit 16 and the controller 17 has the function of controlling the actually sucked-in air quantity QLI to the value of the desired air quantity QLS. It is of course also possible as an elaboration of FIG. 1 to provide the controller 17 with a limiting arrangement for the output signal at its output analogous to what is shown in FIG. 1 in the charge pressure control loop.

The entire anticipatory control that consists of the static anticipatory control 20, the temperature anticipatory control 24 and the anticipatory control correction 22 has the function to produce an output signal, dependent upon its input signals at the time, by which the converter 30 and thereby the turbosupercharger 31 can be affected in their operation.

All three control signals, namely the output signal of the charge pressure control loop TP, the output signal of the air quantity control loop TQ and the output signal of the anticipatory control TV then form a signal for the control input of the converter 30 and thereby affect the operation of the turbosupercharger 31. This signal is limited to prescribed maximum values by means of the minimum selector 19 and the limiter 18, in order to be then correlated with the output signal DV of the dynamic anticipatory control 21. The signal TS finally controls the converter 30 through the interrupter 27 when the latter is closed. The air quantity control loop is closed by means of the air quantity meter 33 and the charge pressure control loop is closed by means of the charge pressure sensor 34.

The charge pressure reference characteristic field 10 and the air quantity reference characteristic field 15 involve three-dimensional characteristic fields of two independent input variables which are empirically derived from the particular internal combustion engine. The static anticipatory control 20 likewise involves a three-dimensional characteristic field which is determined in an analog fashion. The correction characteristic control 22, on the other hand, comprises only a single characteristic line by which fluctuations of the battery voltage are compensated out. Even in the case of temperature anticipatory control 24 and the altitude correction source 14 some empirically derived characteristic fields of at least two dimensions are involved. The dynamic anticipatory control 21 can for example have a so-called leading behavior. This signifies that something like a real differentiator is involved in the dynamic anticipatory control 21. The behavior of such a dynamic anticipatory control can be observed from FIG. 2. The controller 21 is sometimes referred to as a leading controller or a differential operator with retard.

Figure 2:
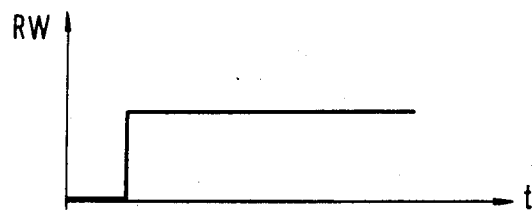
FIG. 2 is a graph of the behavior of the dynamic anticipatory control.
Figure 2:
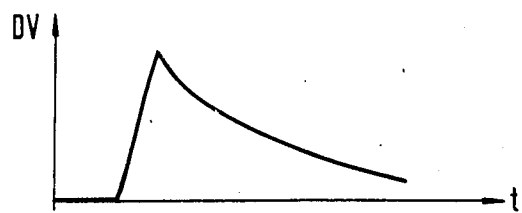

If the control displacement RW jumps upwards by a certain amount as shown, for example in the upper graph of FIG. 2, that has the consequence that the output signal DV of the dynamic anticipatory control 21 has the behavior shown in the lower graph of FIG. 2. If the control displacement changes in the opposite direction, there is a corresponding reaction of the output signal DV of the dynamic anticipatory control 21. The behavior of the dynamic anticipatory control illustrated in FIG. 2 is in itself known under the designation of a leading behavior, as already mentioned.

FIG. 1 shows, as above described, the circuit block diagram of a control of a turbosupercharger according to the invention with anticipatory control. On an overall basis this control, as already explained, has three branches, namely the charge pressure regulation, the air quantity regulation or indirect charge pressure regulation, and the anticipatory control. It is particularly advantageous, now, to dimension the two regulation branches so that they are detached from each other in their effect on the supercharger. In the illustrated example this means that, for example, that the charge pressure regulation and/or the anticipatory control have effect upon the supercharger only at relatively small values of the control displacement RW, while the effect of the air quantity regulation becomes effective only at relatively large values of the control displacement RW. This detachment is obtained in the described example of FIG. 1 on the one hand by the assistance of the limiting unit 13 and on the other hand by means of the air quantity reference characteristic field 15.

Figure 3:
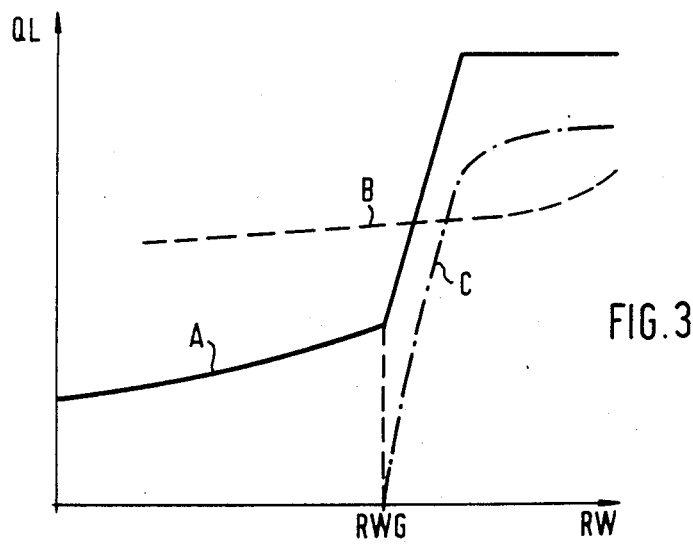
FIG. 3 is a graph showing indirect charging pressure control by way of the air quantity.

FIG. 3 shows the indirect charge pressure regulation by way of the air quantity. The above-mentioned decoupling of the charge pressure regulation by the air quantity regulation will now be described in more detail by reference to FIG. 3. FIG. 3 shows a diagram on which the control displacement RW is plotted as the abscissa and the air quantity QL is plotted as the ordinate. The particular predeterminable control displacement is designated RWG. The diagram of FIG. 3 shows, altogether, three curves A, B and C. On the assumption that, in addition to the regulation of a turbosupercharger in accordance with the invention with anticipatory control according to FIG. 1, there is also present control of the regulation of the exhaust gas recycling rate of the engine, the curve A shows the course of the desired air quantity for the exhaust gas recycling rate control. For RW<RWG the curve shows a slowly rising course for the desired air quantity. The air quantity actually supplied to the engine is measured by means of the air quantity meter of the exhaust recycling system. Desired and actual values are compared with each other and the actual value is regulated to the desired value by the exhaust gas recycling rate control.

In the region RW<RWG the charge pressure of the engine is affected only through the charge pressure regulation according to FIG. 1. The air quantity regulation does not interfere or attack in this region, since on the basis of the quantity reference characteristic field 15 the desired sucked-in air quantity QSL is equal to 0 for small control displacements RW (curve C in FIG. 3) and the controller 17 can provide only positive output signals TQ. Overall, therefore, for control displacements RW<RWG, the air quantity supplied to the engine by means of the exhaust gas recycling control is affected by the curve A of FIG. 3, as well as by the charge pressure present at the engine by means of the charge pressure regulation according to FIG. 1. For control displacements RW which are greater than the limit value RWG, the reference value of the exhaust gas recycling rate control according to curve A of FIG. 3 is set at a high value. This has the effect that the exhaust gas recycling control closes the exhaust gas recycling valve completely, so that no return of exhaust gas takes place anymore. The basis for this procedure lies in the fact that for control displacements RW>RWG, the fresh air supply required by the engine can no longer be covered when a part of the air quantity supplied to the engine consists of exhaust gas. The limiting unit 13 operates in the region RE>RWG in cooperation with the charge pressure regulation. This means that the control signal TP in this region takes on a maximum value and that it therefore can no longer carry out the regulation of the charge pressure of the engine. In contrast to that, it can be seen from the diagram of the air quantity reference characteristic field 15 of FIG. 1, that for control displacements RW>RWG, the reference value QLS>0. It should be mentioned in this regard that the curve shown in the diagram of the air quantity reference characteristic field 15 corresponds to the curve C of FIG. 3 and therefore to the desired air quantity for the air quantity regulation. For control displacement RW>RWG, accordingly, the air quantity regulation is active in the system of FIG. 1. On an overall basis, a decoupling or separation takes place at the limiting value RWG and indeed the charge pressure regulation is decoupled from the air quantity regulation.

The curve B also shown in FIG. 3 represents the air quantity QL as a function of the control displacement RW, which because of the anticipatory control and therefore as the result of the control signal TV, affects the converter 30 and thereby the supercharger 31. The course of the curve B is empirically derived and this is done for the purpose of obtaining the quickest possible reactions of the turbosupercharger to changes of the control displacement RW.

In connection with the description of FIG. 3, the assumption was made that in addition to the regulation according to the invention shown in FIG. 1, there is also present an exhaust gas recycling regulation. This is not absolutely necessary, however. In a system without exhaust gas recycling control, nothing is changed in principle of the control according to the invention shown in FIG. 1. What is needed is only to fit the characteristic lines and characteristic fields to the corresponding application of the system.

It is also possible to simplify the control set forth in FIG. 1 in accordance with the invention by utilizing only one of the two control loops for setting the charge pressure of the engine. In such an application of the system, however, a separate or independent control is no longer possible. The rapid reaction of the turbosupercharger to control displacement changes, however, can also be obtained in these cases with the assistance of anticipatory control.

There is also the possibility of bringing the limiting unit 13 into play only after the operation of the summation 25, especially if, for example, the indirect charge pressure regulation by means of the air quantity is not provided in the system. In this case, if desired, the minimum selector 19 and the limiting unit 18 can be omitted. The function of the two blocks 18 and 19 can then be replaced by a corresponding dimensioning of the characteristic of the limiting unit 13. The feedback from the limiting unit 13 to the controller 12 and if desired also to the controller 17 is also necessary in some circumstances in the case of this possibility of modification. Basically, the control according to the invention shown in FIG. 1 can be modified and/or simplified and/or extended in four different ways. The constitution of the individual elements of the block circuit diagram of FIG. 1 thus does not represent any basic problem for a person active in the field of this technology. The core of the invention still lies in the anticipatory control, thus in the fact that independently of any other controls or regulations the exhaust gas driven turbosupercharger is controlled by means of prescribed values in an advantageous way.

In the block circuit diagram of FIG. 1, the actual relative charge pressure PLI is formed or generated by building the difference between the absolute charge pressure PABS and the atmospheric pressure PATM. In this respect, there is, however, also the possibility to measure the actual relative charge pressure PLI directly by means of the charge pressure sensor 34. The difference building 35 just mentioned is in that case superfluous.

In the discription of FIG. 1, mention was made of control signals TP or TV. These can be analog signals, in which case the signal T represents an average current for control of the converter 30, for example. It is also possible, however, for these signals to consist of keying ratios or other digital signals. In these last-mentioned cases, under certain circumstances corresponding suitable signal processing and/or conversion is necessary within the converter 30.

Moreover, in connection with the description of FIG. 1, the control displacement RW is designated as a possible input magnitude of the control according to the invention. It is however also possible, instead of the signal RW regarding the control displacement representative of engine load, to use with equal value other signals, thus for example a signal relating to the gas pedal position and/or a signal relating to the fuel injection quantity, etc. In general, the signal RW represents a signal regarding the load under which the engine operates. It is accordingly appropriate to refer to it as a control displacement since in operation of an engine some control member is usually displaced in accordance with engine load.

In the practice of the invention, it is advantageously possible to monitor the turbosupercharger. This can be done, for example, by having the output signal of difference circuit 11, therefore the difference between the actual and desired relative charge pressure to be checked by the controller 12 to determine whether this difference signal exceeds a certain limit value over a long period of time. If that is the case, that signifies that the control of the charge pressure of the engine according to the invention cannot regulate the pressure to the desired value. In this case, the controller 12 can then allow, for example, the charge pressure of the engine to be controlled to minimum values and/or in the case of an electronically controlled or regulated fuel injection, the injected fuel quantity can have only minimum values. Of course there are still other possibilities of affecting the engine in the indicated malfunction cases.

The controller 12 is an ordinary PI controller which has a output that is in part proportional to the input and in part the result of integration of the input, so that the response to a step wave, for example, is an immediate rise followed by a gradual rise resulting from integration.

The limiting unit 13 is a circuit which for values of input within a prescribed range of magnitude, usually range of values symmetrically distributed around the null value in the center, the output is proportional to the input, whereas beyond that range of values there is no further change in the output regardless of how much beyond that range of values the input signal swings. Such a behavior can of course be produced in a simple way by the use of a pair of oppositely poled biased diodes in shunt with a signal source. The minimum signal selecting circuit 19, as its name implies, is a circuit with two inputs that selects the smaller of the two input signals for furnishing at the output. The activation circuit 28 is simply a threshold circuit, which may be a Schmitt trigger circuit or simply a biased diode circuit which will provide an output signal when the input signal reaches a predetermined threshold value. Thus, in a motor vehicle, when the voltage of the vehicle battery reaches thirteen volts, for instance, that is an indication that the battery is being charged, which means that the engine has start and the starter has been disconnected.

In the converter 30, it is convenient to provide the desired underpressure for changing the charging pressure of the turbosupercharger 31 in response to a change of keying ratio of an electrical signal. This can be performed by intermittent operation of a valve connected to a vacuum source beginning at a predetermined low value of an electrical signal with a small "on" time and then proceeding to let the proportion of "on" time of the valve increase until the valve reaches a maximum "on" time condition at an upper predetermined value of the electrical signal, in that case, bringing the pressure down to, for example, 300 m bar (when the valve is closed, atmospheric pressure of approximately 1000 m bar is provided).

Figure 4:
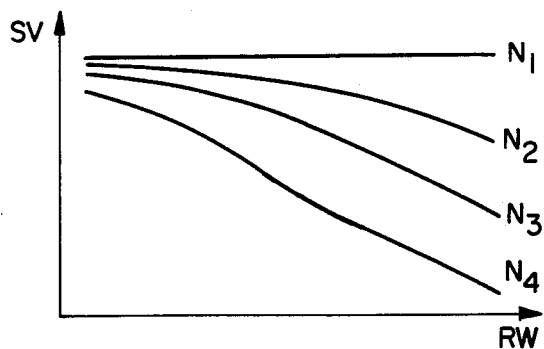
FIG. 4, 5, 6 and 7 are graphs illustrating characteristic curves for different ranges of engine speed for deriving the output signal from the input signal of four different components of the circuit of FIG. 1.

FIG. 4 shows a graph of typical curves with static anticipatory control 20. There are four curves each relating to one of the engine speed ratios n1 n2, n3, and n4, which show in the usual way the relation between the output signal SV measured on the vertical axis of the graph for the input signal RW measured on the horizontal axis.

A limit value circuit 18 shown in FIG. 1 has a graph on it plotting the output TG in the vertical direction for an input N measured on the horizontal axis. As the engine speed N increases (either continuously or stepwise as the unit may be designed) a limit value TG for the minimum selection circuit 19 is furnished, which becomes smaller the higher the engine speed is.

Figure 5:
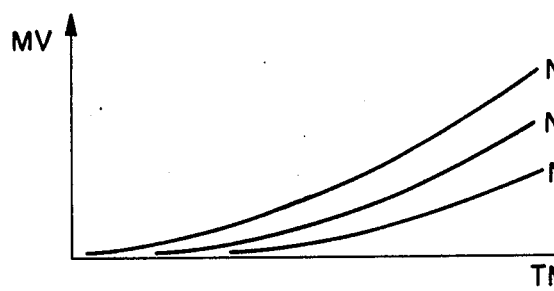
Figure 6:
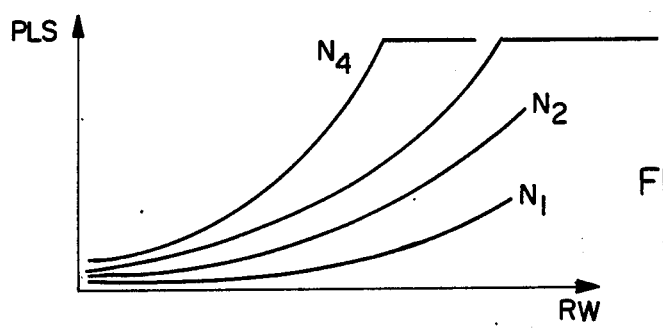
Figure 7:
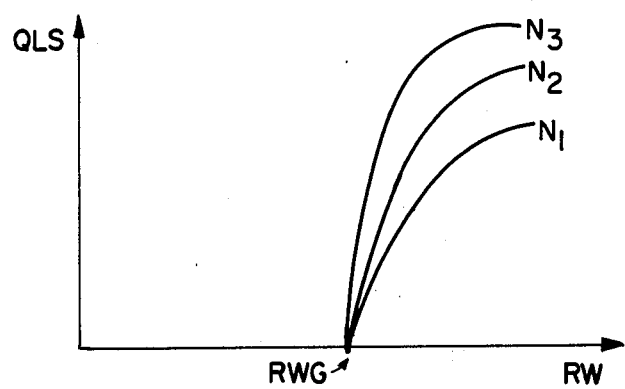

FIGS. 5, 6 and 7 respectively show typical sets of curves for respective ranges of engine speed by which, in the case of FIG. 5, the temperature anticipatory control output MV of the unit 24 is produced for different values of motor temperature TM, in the case of FIG. 6 for deriving the output PLS from the input RW in the reference charge pressure unit 10 and, in the case of FIG. 7 for deriving the reference air quantity QLS from the control displacement RW. In each of these cases $N_1$ designates a speed range of speeds slower than the speeds of the range $N_2$, which are in turn smaller than those of the speed range $N_3$ and so on.

Although the invention has been described with reference to a particular illustrated example, it will be understood that modifications of variations are possible within the inventive concept.

What is claimed:

1. Apparatus for control of the charge pressure provided to an internal combustion engine by an adjustable turbosupercharger having a displaceable output-affecting control member for its mechanism, whereby the air supply to said engine through said turbosupercharger is controlled by a regulation loop in which a desired air supply for the particular engine operating conditions is compared with actual air supply to produce an error signal for control of the air output of said adjustable supercharger by said displaceable control member, and wherein according to the invention there are superimposed upon said error signal both a static anticipatory control signal dependent upon engine speed and engine load and also a dynamic anticipatory control signal dependent upon rate of change of engine load, the negine load being measured by the displacement of a mechanical member in response to engine load value, the rate of change of engine load by the rate of said displacement and said static anticipatory control signal including additive contributions of correction signals responsive respectively to battery voltage and engine temperature.

2. Apparatus for controlling the charge pressure of air supplied to an internal combustion engine by an adjustable turbosupercharger having a displaceable output-affecting control member for its mechanism, including first and second regulation loops providing error signals for additive combination and for combined control of said supercharger, said first regulation loop comprising means for measuring air charging pressure at said engine, means for deriving, from environment and engine operating conditions, a reference pressure signal and means for comparing said actual air charging pressure signal with said reference pressure signal and deriving thereby an error signal, said second regulation loop comprising means for measuring air quantity supply to said engine, means for deriving from engine operating conditions a reference air quantity signal and means for comparing said measured air quantity signal with said reference air quantity signal and deriving thereby an error signal, said apparatus further comprising:

means for deriving a static anticipatory control signal responsive to a displacement of said displaceable control member of said turbosupercharger and to engine speed and for adding said static anticipatory control signal to said error signals before the sum of said error signals is utilized for control of said turbosupercharger, said turbosupercharger being equipped with a control converter (30), responsive to an electrical signal derived from said error signals and said anticipatory control signals, for producing mechanical displacement of said displaceable control member of said turbosupercharger.

3. Apparatus according to claim 2, in which means are provided for modifying said static anticipatory control signal by an additive correction which varies with motor temperature and engine speed, said additive correction being added to said static anticipatory control signal and said error signals.

4. Apparatus according to claim 3, in which means are also provided for modifying said static anticipatory control signal by providing an additive correction signal dependent upon engine battery voltage which is added to said static anticipatory control signal and said error signals.

5. Apparatus according to claim 4, in which stored addressable fields of characteristics are utilized for deriving said reference charge pressure signal from engine load and engine speed, for deriving said static anticipatory control signal from engine load and engine speed, for deriving said engine temperature correction signal from motor temperature and engine speed and for deriving said reference air quantity from engine load and engine speed.

6. Apparatus according claim 5, in which an addressable stored characteristic field is also provided producing a signal (PLK) for correcting the comparison of actual charge pressure and reference charge pressure for both atmospheric pressure and engine speed, and in which also an atmospheric pressure signal is subtracted from the measured charge pressure signal to produce a relative actual charge pressure designed for comparison with said reference charge signal.

7. Apparatus according to claim 2, further comprising means for deriving a dynamic anticipatory control signal in a manner dependent upon rate of change of engine load and means for adding said dynamic anticipatory control signal to a signal derived from the sum of said error signals and said static anticipatory control signal for control of said turbosupercharger.

8. Apparatus according to claim 2, further including means for providing a lower limit signal dependent upon engine speed, a minimum selector circuit applied with said lower limit signal and with the sum signal formed by the sum of said error signals and of said static anticipatory control signal for providing as an output the lesser of its said input signals and also means for generating a dynamic anticipatory control signal dependent upon rate of change of engine load and for adding said signal to the output of said minimum selector circuit to produce a combined signal for controlling said turbosupercharger.

9. Apparatus according to claim 8, including means for modifying said combined signal during a starting operation of said engine before said combined signal is applied for control of said turbosupercharger.

10. Apparatus according to claim 2, in which both said first and said second regulation loops include proportional-integrating (PI) controllers in the output portion of said signal comparing and signal deriving means, and in which said first regulation loop also includes signal range limiting means following said controller thereof.

11. Apparatus according to claim 10, in which said reference air quantity signal for low values of said control displacement, and therefore for low values of load of said engine, is equal to zero.

12. Apparatus according to claim 2, in which said means for measuring air charging pressure of said first regulation loop are means for measuring relative air charging pressure and comprise the sensor having an output signal representative of absolute air charging pressure, means for producing a signal representative of atmospheric pressure as well as means for subtracting said signal representative of atmospheric pressure from said signal representing absolute air charging pressure and thereby supplying an output representative of relative air charging pressure.

13. Apparatus according to claim 12, in which monitoring means are provided for setting the control of said turbosupercharger at a predetermined fixed value when the difference between the actual value of relative air charte pressure and the reference value of air charge pressure determine by said comparing means of said first regulation loop exceeds a second predetermined value.

14. Apparatus according to claim 13, in which said monitoring means is constituted for additionally setting the rate of fuel supplied to said engine at a predetermined fixed value at the same time that the setting of control of said turbosupercharger is set at said predetermined fixed value.

15. Apparatus according to claim 12, in which said signal representative of relative air charge pressure provided with a further additive correction (PLK) dependent upon atmospheric pressure and engine speed at the time it is compared with said reference air charge pressure.

* * * * *